United States Patent [19]

Grantham et al.

[11] Patent Number: 4,498,347

[45] Date of Patent: Feb. 12, 1985

[54] FLUID FLOW MEASURING

[75] Inventors: LeRoy F. Grantham, Calabasas; Norman W. Heath, Canoga Park, both of Calif.

[73] Assignee: Rockwell International Corporation, El Segundo, Calif.

[21] Appl. No.: 481,012

[22] Filed: Mar. 31, 1983

[51] Int. Cl.³ .............................................. G01F 1/46
[52] U.S. Cl. ................. 73/861.66; 73/861.67
[58] Field of Search ............... 73/182, 861.65–861.68, 73/863.57–863.58, 863.24

[56] References Cited

U.S. PATENT DOCUMENTS

| | | | |
|---|---|---|---|
| 1,255,622 | 2/1918 | McFarland | 73/861.66 |
| 1,438,811 | 12/1922 | Coyne | |
| 2,488,810 | 11/1949 | Easterday | 73/182 |
| 2,532,316 | 12/1950 | Larkin | 150/52 |
| 3,327,530 | 6/1967 | Lepird | 73/182 |
| 3,380,298 | 4/1968 | Hanson | 73/861.65 X |
| 3,518,565 | 6/1971 | Dieterich | 73/861.66 |
| 3,638,490 | 2/1972 | Buettner | 73/212 |

Primary Examiner—Charles A. Ruehl
Attorney, Agent, or Firm—H. Fredrick Hamann; Harry B. Field

[57] ABSTRACT

Means for ensuring the accuracy and reliability of fluid flow measurements when the fluid contains substantial quantities of entrained particulates, the measurements being taken with a pitot tube and a pressure-sensing means wherein the pitot tube is disposed in a duct through which the fluid flows and has at least one velocity pressure-sensing orifice facing the upstream direction of flow. The means includes a remotely controllable rotation means for interposing a barrier between the orifice and the upstream direction of flow when velocity pressure measurements are not being taken. In accordance with one embodiment the rotation means comprises a remotely actuated cover and in another embodiment the rotation means comprises means for rotating the tube whereby the orifice faces in a downstream direction when velocity pressure measurements are not being taken. There also is provided means for purging the orifice.

5 Claims, 6 Drawing Figures

FLUID FLOW MEASURING

BACKGROUND OF THE INVENTION

The present invention broadly relates to the measurement of fluid flow. It particularly relates to a device for ensuring the accuracy and reliability of fluid flow measurements taken from a pitot tube with a pressure-sensing means. When pitot tubes are employed in connection with pressure measuring devices for determining the flow of fluids, either liquids or gases, they frequently can become clogged with foreign matter which lodges in the openings or orifices in the tubes. This clogging results in erroneous or erratic readings and may necessitate ceasing operations for a sufficient time to permit the removal and cleaning of the tubes. Various devices have been suggested to overcome this problem.

In U.S. Pat. No. 1,438,811 there is disclosed a device which permits the examination, removal and cleaning of a pitot tube without the necessity of cutting off the passage of fluids passing through the conduit in which the pitot tube is located. Broadly, the device comprises a bushing extending through one side of the conduit and adapted to removably receive the pitot tube. A sleeve extends through the opposite side of the duct and is adjustable toward or away from the bushing. The device further includes means for closing the outer end of the sleeve when it is separated from the bushing, the means being adapted to being opened when the sleeve is in contact with the bushing. While the device disclosed performs its intended function, it obviously requires considerable time and manual steps to perform the cleaning operation.

U.S. Pat. No. 2,488,810 discloses an automatic shutter mechanism for covering the opening in a pitot tube for use on an aircraft. The device includes a shutter which is biased by a spring to cover the opening to the tube. It further includes a pressure plane which is acted upon by air during flight of the aircraft to withdraw the shutter and uncover the opening in the pitot tube by overcoming the spring force.

U.S. Pat. No. 2,532,316 discloses an automatically releasable cover for aircraft pitot tubes. The device comprises a fabric cover which encloses the free end of the pitot tube, a latching means for retaining the cover in position, and an air pressure responsive means adapted to automatically release the latching means upon forward movement of the aircraft after it has reached some predetermined rate of speed.

U.S. Pat. No. 3,380,298 describes a device for purging a pitot tube. The device comprises a three-way valve connected to a static side of the pitot tube, the static side of a manometer, and a supply of gas under pressure. A second three-way valve is connected to the velocity pressure side of the pitot tube, the velocity pressure side of the manometer and the supply of gas under pressure. A third valve is provided to connect the two three-way valves and cut off both of those valves from the supply of pressurized gas and open them to the atmosphere to exhaust pressurized gas therefrom. There further is disclosed a means for operating all the valves in appropriate sequence.

U.S. Pat. No. 3,638,490 describes another fluid flow measuring device. The device includes means for determining the velocity and depth of a flowing body of fluid such as fluid flowing in a water or sewer main. The means includes a conduit immersed in the flowing fluid, means for forcing gas out through the immersed conduit into the flowing fluid and other means responsive to the force or pressure required to force gas into the flowing fluid. The means responsive to the force or pressure is calibrated to indicate information from which the depth or velocity of the fluid body can be determined.

SUMMARY OF THE INVENTION

The present invention provides means for ensuring the accuracy and reliability of fluid flow measurements when the fluid contains substantial quantities of entrained particulates. Such fluids frequently are generated in the oxidation, partial oxidation, pyrolysis or hydrogenation of hydrocarbon materials and in the treatment of hydrocarbon-containing waste materials such as in drying and calcination processes. In such an environment the conventional fluid flow measuring devices such as pitot tubes used in connection with sensitive pressure-sensing means quickly become inoperable. The present invention provides an improvement in such a device which utilizes a combination of a static pressure-sensing tube and a velocity pressure-sensing tube having an upstream-facing orifice. In accordance with the present invention, there also is provided a remotely operable rotation means for interposing a barrier between the velocity pressure-sensing orifice and the upstream direction of flow during such times as velocity pressure measurements are not being taken. In accordance with one embodiment of the invention the rotation means comprises a remotely actuated cover rotatable between a first position in which it covers the orifice and a second position in which the orifice is exposed for taking velocity pressure measurements. In accordance with another embodiment, the rotation means comprises means for rotating the velocity pressure-sensing tube 180° such that the orifice faces a downstream direction when velocity pressure measurements are not being taken.

In accordance with a particularly preferred embodiment, there further is included a means for purging the velocity pressure-sensing tube. The purging means comprises a three-way valve interconnecting the velocity pressure-sensing tube, the pressure measuring means, and a source of pressurized gas such as air. The valve is operable between a first position in which the pressure-sensing tube and the source of air are in fluid communication, and fluid communication to the pressure measuring means is blocked. In a second position the pressure-sensing tube and pressure-measuring means are in fluid communication, and fluid communication to the source of air is blocked. Advantageously, there is further provided a two-way valve interconnecting the three-way valve and pressure-measuring means. The two-way valve is a normally open valve providing fluid communication between the three-way valve and the pressure-measuring means and operable to a closed position in which fluid communication is blocked. The purpose of this valve is to ensure that high-pressure air does not get through to the sensitive pressure-measuring means. Means are provided for ensuring the two-way valve is in a closed position prior to operation of the three-way valve in a position to provide fluid communication between the source of pressurized air and the velocity pressure-sensing tube.

It is therefore a principal object of the present invention to provide a relatively reliable means for measuring fluid flows in ducts when the fluid contains substantial quantities of entrained particulates. Another object is to provide a relatively simple and inexpensive means for measuring fluid flow when the measuring means is exposed to a contaminated environment.

Another object is to provide means for more accurately determining the flow of gas streams in conduits. Still another object is to provide means capable of being cleaned in situ without the necessity of removing the device from the conduit. Another object is to provide a flow measuring means which is protected from clogging when not in operation without the necessity of removing it from the conduit.

The above and other objects and advantages of the present invention will become more apparent with reference to the following detailed description when read in conjunction with the accompanying drawings.

DETAILED DESCRIPTION OF THE DRAWINGS

Figure 1:
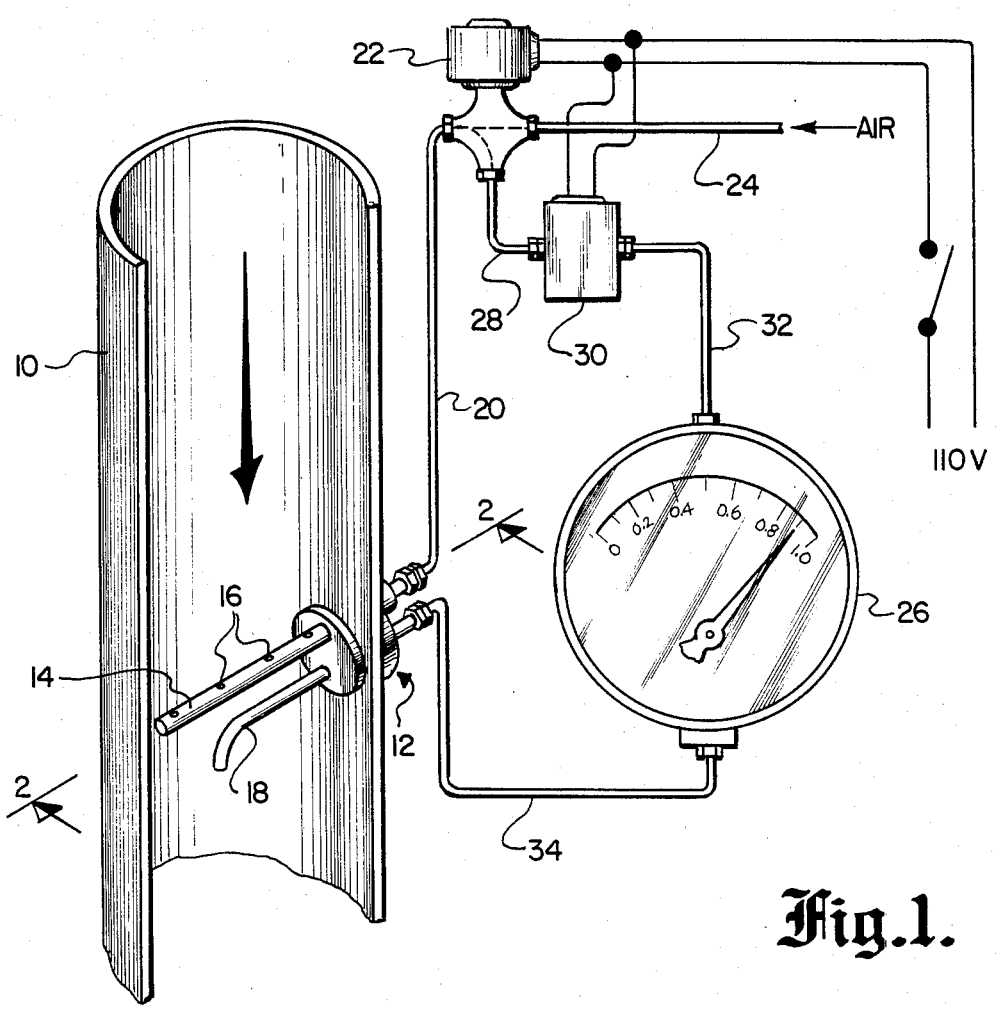
FIG. 1 is a diagramatic representation of a flow measuring device constructed in accordance with the present invention.

Referring to the drawings more particularly by reference number, the reference number 10 indicates a duct partially broken away to show a pitot tube flow measuring device 12 (which will be described in more detail later) that includes a velocity pressure sensing tube 14 which projects outwardly into duct 10. Tube 14 is provided with a plurality of orifices 16 which, during normal operation of the flow measuring device, face in an upstream direction. Device 12 also includes a static pressure-sensing tube 18 which also projects into duct 10 and terminates in a downstream facing portion provided at its lower or terminal end with an orifice (not shown) for sensing static pressure. The orifices 16 in velocity pressure-sensing tube 14 are in fluid communication with a line 20 which terminates at its other end in a three-way valve assembly 22. Valve assembly 22 is in fluid communication with a source of compressed gas, for example, pressurized air, via a line 24 and is connected to a differential pressure-sensing gauge 26 via lines 28, an optional, normally open two-way valve 30 and a line 32. Static pressure-sensing tube 18 is in fluid communication with differential pressure-sensing gauge 26 via a line 34.

During normal operation velocity pressure is sensed through orifices 16 through lines 20, three-way valve 22, line 28 and normally open two-way valve 30 and line 32, line 24 being isolated or closed. When cleaning becomes necessary, electrical power is supplied to valves 30 and 22. Valve 30 preferably is a fast-closing, slow-opening valve such that when valve 22 is energized to provide fluid communication between lines 20 and 24, valve 30 will be fully closed before such fluid communication is established and will remain closed until such time as valve 22 is returned to its normal operation position. Various other means of providing an appropriate operational sequence of the valves will be obvious to those skilled in the art. Such means include, for example, separate switches for each valve which may be manually operated or the use of time delay relays, mechanical interlocks and the like for automatic operation.

Figure 2:
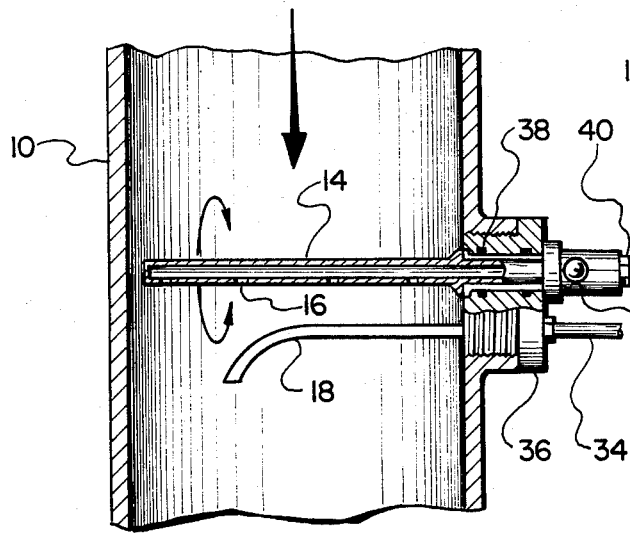
FIG. 2 is a side elevation view taken along lines 2—2 of FIG. 1.
Figure 3:
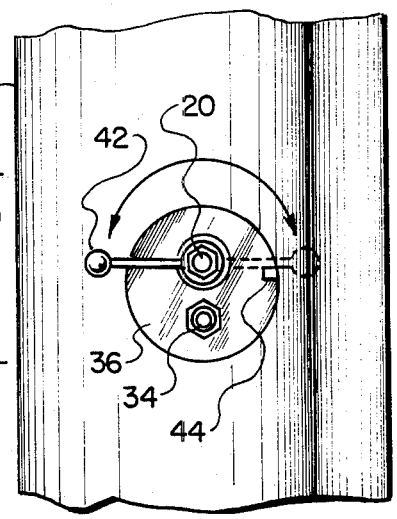
FIG. 3 is an end view taken along lines 3—3 of FIG. 2.

Referring now to FIGS. 2 and 3, wherein flow measuring device 12 is shown in greater detail, it is seen that the device further includes a bushing 36 which is secured in a threaded opening provided in duct 10. In this particular embodiment, velocity pressure-sensing tube 14 is rotatably mounted in bushing 36 which is provided with seals 38 to prevent the escape of gas from duct 10. Tube 14 is interconnected with line 20 via a conventional, commercially available swivel coupling 40.

Referring now to FIG. 3, it is seen that there also is provided a handle 42 for rotating tube 14 between a normal operating position shown in phantom and a second position in which orifices 16 face downstream, such that when the device is not being used for flow measurement no plugging of the orifices will occur since the closed or back side of the tube now faces the upstream flow and acts as a barrier to any entrained particulates. Advantageously, bushing 36 further includes an indexing stop 44 to ensure that when the handle is rotated to place tube 14 in its normal operating position, orifices 16 will be facing upstream in substantially the same precise location.

Figure 4:
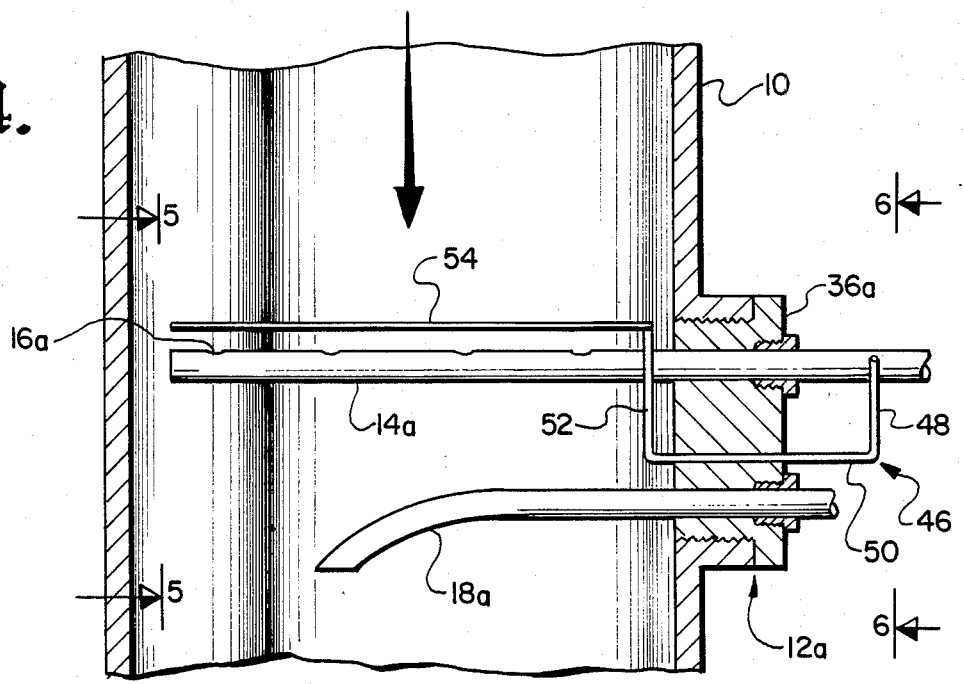
FIG. 4 is a side elevation view of a flow measuring device constructed in accordance with another embodiment of the invention.
Figure 5:
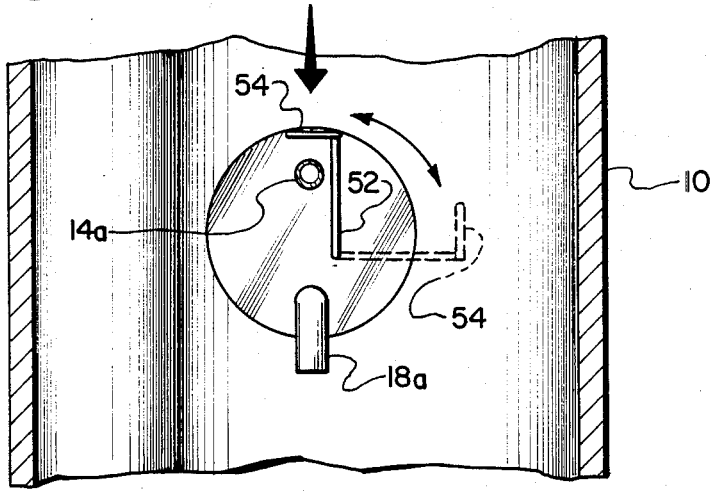
FIG. 5 is an end view taken along lines 5—5 of FIG. 4.
Figure 6:
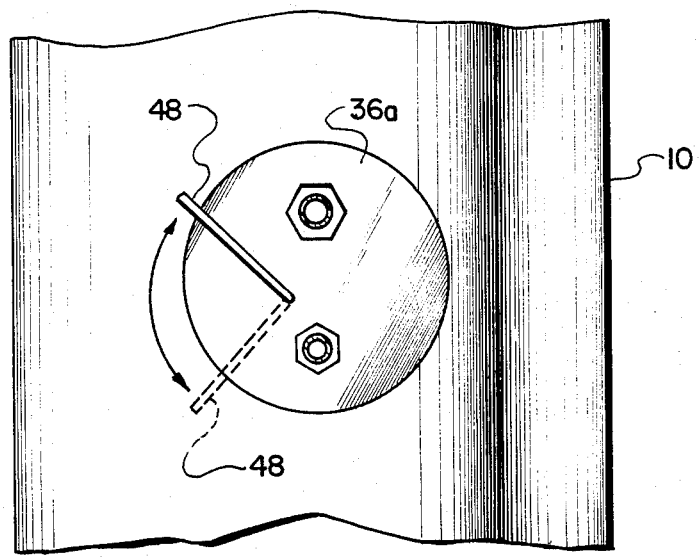
FIG. 6 is an end view taken along lines 6—6 of FIG. 4.

Referring now to FIGS. 4-6, therein is depicted another device 12a in accordance with the present invention. In the embodiment depicted therein, velocity pressure-sensing tube 14a and static pressure-sensing tube 18a are securely affixed to bushing 36a. In this embodiment, rather than rotating velocity pressure-sensing tube 14a to interpose a barrier between orifices 16a and any entrained particulates in the flow stream, the device includes a cover assembly 46. Cover assembly 46 includes an external handle member 48 which may be of any shape or configuration and a mounting member 50 which has a substantially straight, cylindrical configuration which extends through bushing 36a and duct 10. Mounting member 50 terminates in a shield support section 52 which extends at substantially right angles from mounting member 50 inside duct 10. Support section 52 also is preferably circular in cross section. Affixed to support section 52 is a shield member 54. As depicted, shield member 54 is substantially flat and rectangular in shape. For clarity, it has been shown spaced some distance from tube 14a. However, in actual construction, it is advantageously placed as close as possible to tube 14a to prevent particles from entering orifices 16a. In addition, while shown as a flat rectangular section, it will be appreciated that it also could be shaped to conform closely to the outer periphery of tube 14a.

When flow measurements are not being taken, shield member 54 is positioned as shown to interpose a barrier between orifices 16a and any particulates entrained in the flowing fluid. When flow measurements are to be taken, shield 54 is rotated 90° to the side (as shown in phantom) to expose orifices 16a to the flow. In this latter position, shield 54 presents a minimum cross-sectional area to the flow to minimize turbulence in the flow which could affect the reliability of the measurements taken.

While the foregoing description and drawings show a flow measuring device which fulfills all the objects and advantages set forth herein, it will be apparent to those skilled in the art that many changes, modifications, alterations, and variations, as well as other uses and application of the subject device, are possible. Accordingly, all such changes, modifications, alterations, and variations, as well as uses and applications which do not depart from the spirit and scope of the invention, are deemed to be covered by this invention which is limited only by the following claims.

What is claimed is:

1. A device for ensuring the accuracy and reliability of gas flow measurements when said gas contains substantial quantities of entrained particulates, said measurement being taken from a pitot tube with a pressure-sensing means, said pitot tube being disposed in a duct through which said gas flows and having a velocity prressure-sensing tube with at least one orifice facing the upstream direction of flow for measuring velocity pressure, comprising rotation means for interposing a barrier between said orifice and the upstream direction of flow when velocity pressure measurements are not being taken, said rotation means comprising a remotely actuated, external cover rotatable between a first position in which it covers said orifice and a second position in which said orifice is exposed and further including a three-way valve means interconnecting said velocity pressure-sensing tube, pressure-measuring means and a source of pressurized air, said valve means being operable between one position in which said velocity pressure-sensing tube and said source of pressurized air are in fluid communication and fluid communication to said pressure-measuring means is blocked, and a second position in which said velocity pressure-sensing tube and pressure-measuring means are in fluid communication, and fluid communication to the source of pressurized air is blocked.

2. The device of claim 1 further including a two-way valve means interconnecting said three-way valve means and said pressure-measuring means, said two-way valve means being operable between an open position in which fluid communication is provided between said three-way valve means and said pressure measuring means and a closed position in which fluid communication is blocked.

3. The device of claim 2 further including means to provide for actuation of said two-way valve means to a closed position prior to operation of said three-way valve means to provide fluid communication between said source of pressurized air and said velocity pressure-sensing tube.

4. The device of claim 1 wherein said pitot tube extends transversely across said duct and is provided with a plurality of orifices along the length thereof.

5. The device of claims 1 or 4 further including a static pressure sensing tube located in said duct and having at least one downstream facing orifice, and said pressure-measuring means is a differential pressure measuring means which is also in fluid communication with said static pressure sensing tube for measuring a differential pressure between said static pressure-sensing tube and said velocity pressure-sensing tube.

* * * * *